United States Patent
Mende et al.

(10) Patent No.: US 10,355,491 B2
(45) Date of Patent: Jul. 16, 2019

(54) INVERTER, IN PARTICULAR AS PART OF A POWER GENERATION NETWORK, AND METHOD

(71) Applicant: SMA Solar Technology AG, Niestetal (DE)

(72) Inventors: Denis Mende, Grossalmerode (DE); Daniel Premm, Kaufungen (DE); Stephan Sander, Friedland (DE)

(73) Assignee: SMA Solar Technology AG, Niestetal (DE)

( * ) Notice: Subject to any disclaimer, the term of this patent is extended or adjusted under 35 U.S.C. 154(b) by 147 days.

(21) Appl. No.: 15/213,439

(22) Filed: Jul. 19, 2016

(65) Prior Publication Data

US 2017/0012436 A1    Jan. 12, 2017

Related U.S. Application Data (63) Continuation of application No. PCT/EP2015/050932, filed on Jan. 20, 2015.

(30) Foreign Application Priority Data

Jan. 22, 2014   (DE) .................. 10 2014 100 690

(51) Int. Cl.
*H02J 3/38*      (2006.01)
*H02M 7/44*      (2006.01)
*G05F 1/67*      (2006.01)

(52) U.S. Cl.
CPC ............. *H02J 3/385* (2013.01); *G05F 1/67* (2013.01); *H02J 3/383* (2013.01); *H02M 7/44* (2013.01); *Y02E 10/563* (2013.01); *Y02E 10/58* (2013.01)

(58) Field of Classification Search
CPC ............. G05F 1/67; H02J 3/383; H02J 3/385; H02M 7/44; Y02E 10/563; Y02E 10/58
See application file for complete search history.

(56) References Cited

U.S. PATENT DOCUMENTS 4,510,434 A * 4/1985 Assbeck .................. G05F 1/67
                                                323/237
8,344,549 B2   1/2013 Loh et al.
(Continued)

FOREIGN PATENT DOCUMENTS

DE    202010016207 U1   4/2012
WO       2011112350 A2   9/2011
(Continued)

OTHER PUBLICATIONS

International Search Report dated Feb. 13, 2015 PCT/EP2015/050932.

*Primary Examiner* — Rexford N Barnie
*Assistant Examiner* — Elim Ortiz
(74) *Attorney, Agent, or Firm* — Eschweiler & Potashnik, LLC (57) ABSTRACT

An inverter for converting DC power of a generator into grid-conforming AC power includes an inverter bridge circuit and a scanning circuit configured to trace at least one part of a characteristic curve of the generator to determine an MPP power value ($P_{MPP}$). The scanning circuit is configured, in the case of a derating to a derated power ($P_{red}$), to trigger a tracing of the characteristic curve with provision of a first power profile deviating from the derated power ($P_{red}$) if an enable signal is present at the inverter, and to indicate a start and an end of the tracing by outputting a start signal and an end signal, respectively. The scanning circuit is further configured to provide a second power profile as AC power upon receiving a start signal, wherein the first power profile has a deviation from the derated power ($P_{red}$) with a (Continued)

sign that is opposite to a sign of a deviation of the second power profile from the derated power ($P_{red}$).

16 Claims, 6 Drawing Sheets

(56) References Cited

U.S. PATENT DOCUMENTS

| | | | |
|---|---|---|---|
| 2011/0006609 A1* | 1/2011 | Loh | H01L 31/02021 307/82 |
| 2011/0080044 A1* | 4/2011 | Schmiegel | H02J 3/383 307/23 |
| 2014/0001857 A1* | 1/2014 | Cservolgyi | H02J 4/00 307/43 |
| 2015/0137606 A1* | 5/2015 | Adest | G05F 1/67 307/77 |
| 2016/0146921 A1* | 5/2016 | Jeong | G01S 3/7861 250/203.4 |

FOREIGN PATENT DOCUMENTS

| | | |
|---|---|---|
| WO | 2013107782 A2 | 7/2013 |
| WO | 2014048772 A1 | 4/2014 |

\* cited by examiner

INVERTER, IN PARTICULAR AS PART OF A POWER GENERATION NETWORK, AND METHOD

CROSS REFERENCE TO RELATED APPLICATIONS

This application claims priority to International Patent Application number PCT/EP2015/050932, filed on Jan. 20, 2015, which claims priority to German Patent Application number 10 2014 100 690.9, filed on Jan. 22, 2014, and is hereby incorporated by reference in its entirety.

FIELD

The disclosure relates to an inverter for converting DC power of a generator into grid-conforming AC power, a power generation network comprising a plurality of inverters, and a method for converting DC power of a generator into grid-conforming AC power.

BACKGROUND

Since generation installations for renewable energy make a great contribution to the amount of energy produced for the public electricity grid, there is a desire to limit the extent to which energy is fed in by these installations as necessary in order to stabilize the electricity grid for example in the event of low power consumption by the connected loads, or to keep available a power reserve that can be called up at short notice. One possibility for limiting the feeding-in, that is to say for derating, consists in controlling the installation such that it feeds only a predefined percentage of the power available at the optimum operation point MPP (Maximum Power Point) into the connected electricity grid; another possibility consists in derating by a fixed absolute value, for example a predefined percentage of the rated power. In order to fulfill this predefinition optimally, it is necessary to know the maximum possible power of a generator of the installation. Since this power may change greatly over the course of time for example due to varying irradiation in the case of photovoltaic generators, it is necessary to regularly determine the present MPP power value anew. For this purpose, it is necessary to trace a characteristic curve of the generator over a sufficient range which contains the MPP or allows an estimation of the position of the MPP by extrapolation. In order to analyze the generator characteristic in this range, it may be necessary to cause the power fed in from the installation to deviate in part significantly from the derated power.

The document DE102010038941A1 discloses a network of a plurality of inverters operated via a common controller in such a way that one of the inverters is operated at the MPP, while the other inverters adapt their power such that the total power of the network corresponds to a predefined value. This solution requires a high communication overhead between the inverters involved and the common controller. Moreover, particularly in the case of derating to a very low derated power, it is not always possible to operate an installation of the network permanently at the MPP.

SUMMARY

Therefore, this disclosure provides an inverter which is able, within a power generation network, to compensate for a power deviation from a predefined derated power during the determination of an MPP, wherein within the power generation network there is a minimized and robust communication between the inverters involved. The disclosure also provides a method to enable a compensating power provision of an inverter with minimized and robust communication.

An inverter according to the disclosure for converting DC power of a generator into grid-conforming AC power comprises a scanning circuit or unit configured to trace at least one part of a characteristic curve of the generator to determine an MPP power value $P_{MPP}$. In the case of a derating to a derated power $P_{red}$, the inverter triggers a tracing of the characteristic curve with provision of a first power profile deviating from the derated power $P_{red}$ only if an enable signal is present at the inverter. The inverter indicates the tracing of the characteristic curve by outputting a start signal and an end signal, respectively. Furthermore, the inverter is configured, upon receiving a start signal, for example from a further inverter of a power generation network, to provide a second power profile as AC power, wherein the first power profile has a deviation from the derated power $P_{red}$ with a sign that is opposite to a sign of a deviation of the second power profile from the derated power $P_{red}$. In particular, the first power profile has a deviation with a positive sign, i.e. the first power profile comprises increased power values in comparison with the derated power. What is achieved by means of the opposite sign of the second power profile is that in a power generation network in which a second inverter according to the disclosure has generated the abovementioned start signal, the first power profile of which deviates from the derated power, this deviation is at least partly compensated for by the second power profile. However, further inverters according to the disclosure of the power generation network can also contribute to the compensation of the deviation with their second power profile. During the tracing of a characteristic curve by one of the inverters, due to the compensation by the second power profile of the other inverter(s), the total power generated by the power generation network has a deviation from the total derated power that is smaller than the deviation of the first power profile of the inverter tracing its characteristic curve from the derated power thereof.

The term power profile is understood to mean a time profile of the power fed in which results from a targeted tracing of the generator characteristic curve, independently of the parameter predefinitions used to control this tracing. The tracing may be performed for example by means of a time-dependent predefinition of the generator voltage, of the generator current or of the generator power.

In one embodiment, the inverter tracing its generator characteristic curve subsequently provides a present MPP power value $P_{MPP}$ via a communication interface. The value may be transmitted to other inverters of the power generation network and used there to change an estimation of the present MPP power value of this other inverter, the derated power being based on the estimation. In this way, it is possible to take account of changes in the external conditions of the power generation by the generator, for example changes in irradiation, without renewed tracing of the characteristic curve having to be performed by each inverter. This may considerably reduce the number of required scanning processes, for example if the derated power is to be selected as a predefined percentage of the MPP power value or as an MPP power value reduced by a percentage of the rated power and an adaptation of the derated power is intended to be performed in close temporal proximity to changes in the MPP power value.

Particularly if the individual inverters of the power generation network are positioned far apart from one another, the enable signal, the start signal and/or the end signal may be transmitted via an Internet connection. Alternatively, a common line or separate lines for transmitting these signals or a wireless transmission may also be used.

A power generation network according to the disclosure comprises two or more inverters according to the disclosure which are connected to one another for the purpose of exchanging the enable signal, the start signal and the end signal. A control device is optionally provided, which is connected to the inverters of the power generation network and generates the enable signal. In this case, the enable signal may be selectively transmitted to individual inverters or a partial group of inverters of the network or be valid only therefor. Instead of an independent control device, however, one of the inverters may also perform this function or the function may be distributed over a partial group or all of the inverters.

The control device or the inverters involved in generating the enable signal determine the order and frequency of the scanning process within the power generation network. In this case, alternately triggering the tracing of the characteristic curve may be controlled via a token. The token is passed on by the inverter currently carrying out a scanning process, after the conclusion, to another inverter, which thereby acquires the enabling for its part to carry out a scanning process, wherein the receiving inverter may also pass on the token without the latter being used.

In a further embodiment of the disclosure, at least one of the inverters is connected to a generator having adjustable orientation and provides the first power profile during a scanning process by altering the generator orientation instead of altering the generator voltage.

A method according to the disclosure for converting DC power of a generator into grid-conforming AC power by an inverter comprising a scanning unit for tracing at least one part of a characteristic curve of the generator serves for determining an MPP power value if the inverter is in a state reduced to a derated power. The method comprises tracing the characteristic curve with provision of a first power profile deviating from the derated power, under the precondition that an enable signal is present at the inverter. A start signal is transmitted at the beginning of the tracing and an end signal is transmitted at the end of the tracing of the characteristic curve. In the case of receiving a start signal, for example the start signal generated by another inverter of a power generation network, the inverter provides a second power profile as AC power, wherein the first power profile has a deviation from the derated power with a sign that is opposite to a sign of a deviation of the second power profile from the derated power.

In a modification of the method according to the disclosure, the method is carried out jointly on a first and a second inverter. In this case, tracing the first characteristic curve is performed by a step by step increase of a setpoint value for the first inverter, wherein tracing the second characteristic curve is performed in parallel by a step by step decrease—compensating for the increase—of a setpoint value for the second inverter. The increase of the setpoint value may be continued until the first inverter may no longer follow the setpoint value predefinition. The highest achieved setpoint value may determine the MPP power value for the first inverter.

Subsequently, for determining the MPP power value of the second inverter, tracing the first characteristic curve may be performed by a step by step increase of a setpoint value for the second inverter and tracing the second characteristic curve may be performed by a step by step decrease of a setpoint value for the first inverter, the decrease compensating for the increase of the setpoint value of the second inverter. In this case, the highest achieved setpoint value determines the MPP power value for the second inverter.

The different setpoint value may be generated and transmitted by a control unit or by one of the two inverters. The enable signal, and also the start signal and the end signal may be configured as independent signals, or be transmitted implicitly by the different setpoint value. By way of example, the first transmitted setpoint value may be interpreted as a start signal or enable signal, and a setpoint value attributed to the derated power may be interpreted as an end signal.

The inverter may be formed by an inverter group comprising a plurality of individual inverters, wherein tracing the characteristic curve is performed by the individual inverters of the group tracing an individual characteristic curve assigned to the individual inverters successively in a temporally overlapping manner. In this embodiment, the second power profile may be distributed arbitrarily among the individual inverters for provision.

BRIEF DESCRIPTION OF THE DRAWINGS

The disclosure is illustrated below with the aid of figures, in which.

DETAILED DESCRIPTION

Figure 1:
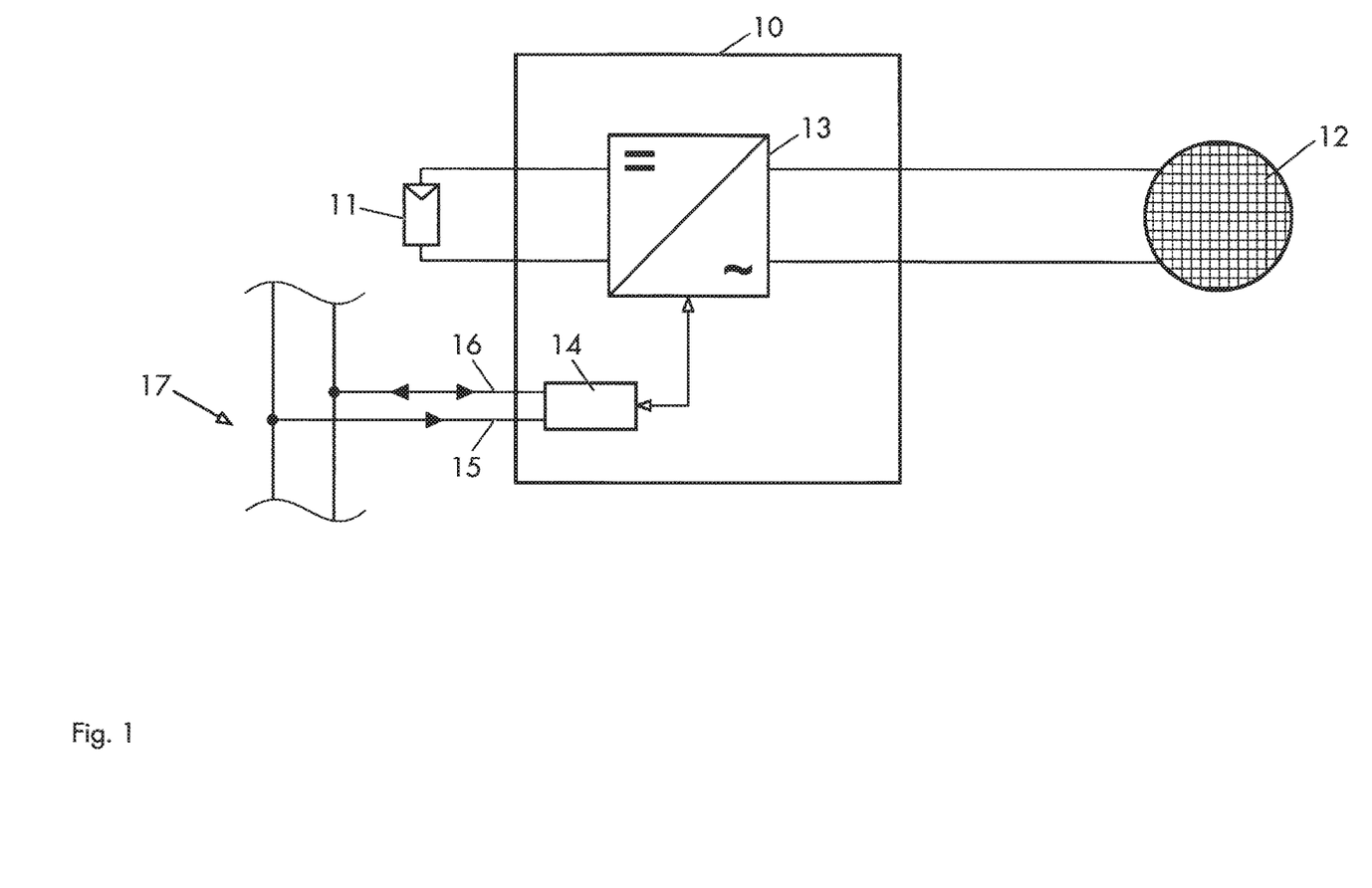
FIG. 1 shows an embodiment of an inverter according to the disclosure.

FIG. 1 shows an inverter 10 according to the disclosure for converting DC power of a connected generator 11, in particular of a photovoltaic generator, into AC power that is transmitted into a connected grid 12, for example a single-phase grid or a polyphase, in particular three-phase, grid. An inverter bridge 13 is used for the power conversion, wherein the inverter bridge is controllable via a scanning circuit or unit 14 in the form that a power converted by the inverter bridge 13 may be set with the aid of the scanning unit 14. In one embodiment the scanning circuit is a controller comprising hardware or a combination of hardware and software that is configured to execute instructions to perform various functions as discussed herein.

The scanning circuit 14 is configured to receive signals that are transmitted via a bus 17. Via a first line the scanning circuit 14 may receive an enable signal 15, and via a second line the scanning circuit 14 may transmit or receive a start signal 16. Via the second line the scanning circuit 14 may additionally transmit or else receive an end signal, wherein it is likewise conceivable for the end signal to be transmitted via a separate line. The first line and the second line may also be separate lines or a common line, in particular a communication connection. By way of example, it is conceivable for the bus 17 to comprise the Internet and for the signals to be transmitted with the aid of an Internet connection. Further inverters or else a control circuit or unit (not shown) may be connected to the bus 17 in order to transmit enable signals, start signals and/or end signals between inverters and/or between an inverter and the control unit.

The scanning circuit 14 serves for triggering and controlling a tracing of a characteristic curve of the generator 11 in order to determine the MPP power value $P_{MPP}$ thereof, that is to say to determine what maximum power the generator 11 is able to produce at a given point in time. This is advantageous particularly in a derated state of the inverter 10, in order to determine a derated power in this state if the derating is to be defined depending on the maximum possible power. In the case of an inverter 10 according to one embodiment of the disclosure, the scanning circuit 14 is configured to trigger such a tracing of the characteristic curve if an enable signal 15 is present at the scanning circuit. The beginning of the tracing of the characteristic curve is indicated by a start signal 16, while the end of the tracing of the characteristic curve is identified by an end signal. In the time period during the tracing of the characteristic curve, that is to say between start signal 16 and end signal, the control device ensures that no enable signal 15 is transmitted via the bus 17 or is present at the inverter 10. Alternatively, the inverter 10 may be configured to interpret this time period as a time period in which the enable signal 15 is not present, wherein only the case where start signal and end signal are transmitted by another inverter connected to the bus 17 is regularly relevant. Therefore in one embodiment this ensures that in each case only one of the inverters of an inverter network that are connected to one another via the bus 17 carries out a tracing of the characteristic curve at a given point in time.

Figure 2:
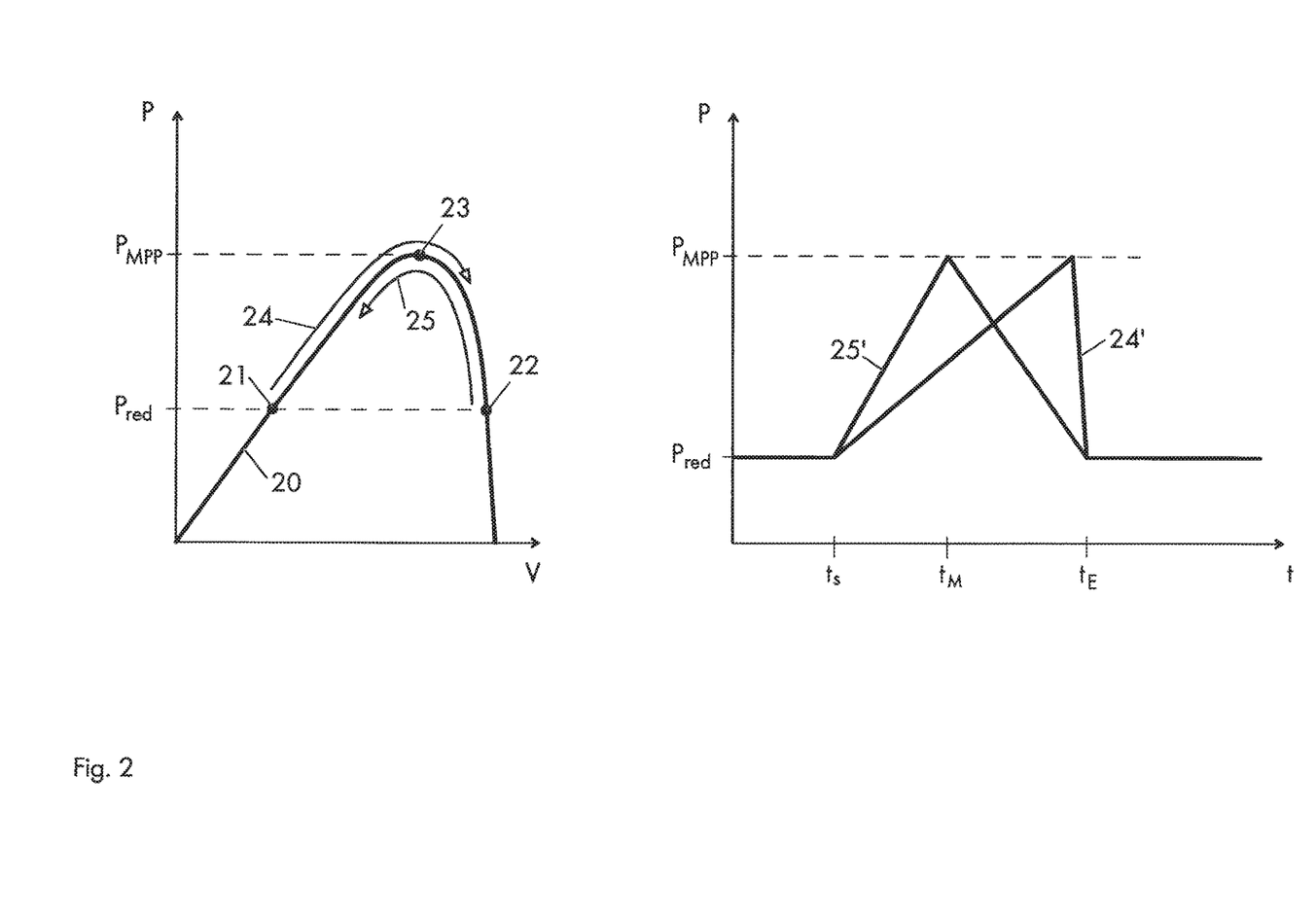
FIG. 2 shows a diagram of a characteristic curve of a generator with tracing paths, and a diagram with power profiles.

FIG. 2 shows, as a first diagram on the left-hand side, a characteristic curve 20 of a generator 11, wherein the power is plotted on the Y-axis and the generator voltage is plotted on the X-axis. On the right-hand side of FIG. 2, a second diagram shows two examples of power profiles 24', 25' that arise during the tracing of the characteristic curve 20 of the inverter 10, wherein time is plotted on the X-axis and power is plotted on the Y-axis. The corresponding tracing paths 24, 25 of the characteristic curve 20 are illustrated in the first diagram.

In a first variant of the tracing of the characteristic curve 20, corresponding to the power profile 24', the inverter 10 is initially in a derated state at the operating point 21 and outputs a derated power $P_{red}$ to the grid 12. Beginning at a start point in time $t_s$, the power output by the inverter 10 is increased with a linear rate of increase, as a result of which the operating point of the generator 11 is shifted to increasing voltages. When the MPP power value $P_{MPP}$ at the MPP 23 is reached, the generator may no longer be able to produce the required power. At this point in time $t_E$, the generator is brought to a derated state again at the operating point 22 and the power fed into the grid is reduced to the derated power $P_{red}$, and the end signal is transmitted. If the MPP power value $P_{MPP}$ attained deviates from a predetermined MPP power value, the derated power $P_{red}$ may be correspondingly adapted after the end of the tracing of the characteristic curve 20.

In a second variant of the tracing of the characteristic curve 20 in accordance with power profile 25', the inverter 10 is initially in a derated state at the operating point 22 with the derated power $P_{red}$. Here, at the start point in time $t_s$, the power profile 25' output to the grid 12 is increased in the form of a ramp until the MPP 23 is reached. At this point in time $t_M$, a central signal may be transmitted and the power is reduced with a ramp until the derated power $P_{red}$ is reached again at the operating point 21. Since, in this case as well, the MPP 23 is reached during the assigned tracing path 25, here as well the MPP power value $P_{MPP}$ at the MPP 23 is known at the end of the tracing and may be taken into account in the derated power $P_{red}$.

As an alternative to the two power profiles 24', 25' shown, other power profiles are also conceivable which lead to a transition in the operating point of the generator 11 between the operating points 21, 22, or those which, proceeding from one of the operating points 21, 22, trace a part of the characteristic curve 20 which suffices to be able to draw conclusions about the currently present MPP power value $P_{MPP}$ at the MPP 23, in order, at the end point in time $t_E$, to end again at the operating point at which the tracing of the characteristic curve 20 began. The power profile may also result from the fact that a predefined voltage or current profile is traced and a corresponding power profile is established on the basis of the present characteristic curve of the generator 11.

Figure 3:
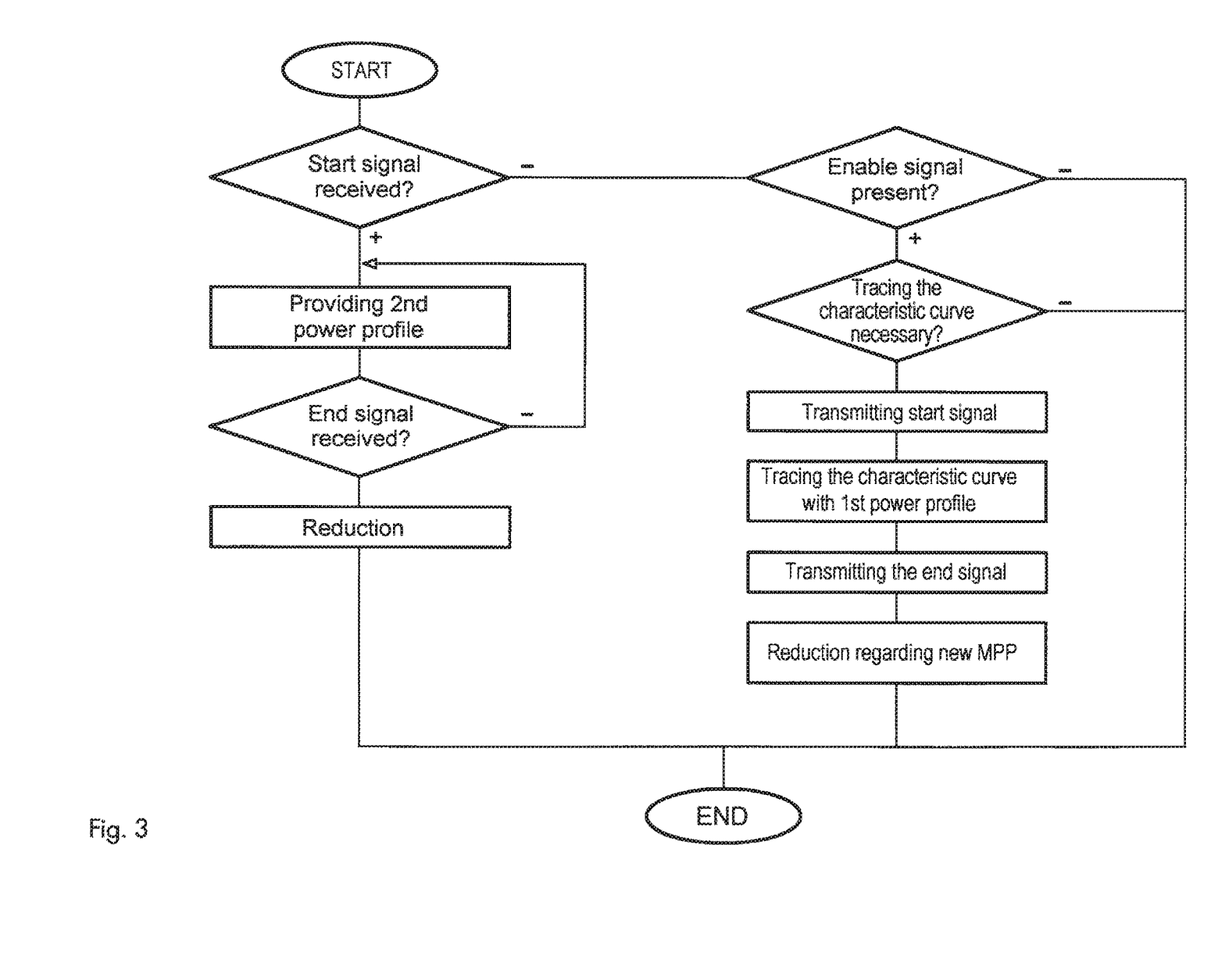
FIG. 3 shows a flow diagram of a method according to the disclosure.

FIG. 3 shows an exemplary flow diagram for a method according to the disclosure in which the inverter 10 initially checks whether a start signal 16 has been received from another inverter connected to the bus 17 at 50. If such a start signal has been received (+ at 50), the inverter 10 begins to provide a second, temporally variable power profile at 52, instead of a constant temporally constant derated power $P_{red}$. The second power profile is provided at 52 until an end signal has been received via the bus 17 at 54. The inverter 10 then returns to providing a temporally constant derated power at 56. Alternatively, the second power profile, beginning with the start signal 16, may also be provided independently of a reception of an end signal, or the end signal may be generated upon the second power profile being passed through completely and may be transmitted by the bus 17. In the last-mentioned variant, the tracing of the first power profile may then be terminated upon receiving an end signal via the bus 17. This encompasses an embodiment in which that power profile which earlier was traced completely leads to the provision of the end signal and thus to the termination of the tracing of the respective other power profile.

If a start signal has not been received (− at 50), the inverter 10 checks whether an enable signal 15 is present at 58 via the bus 17 and whether a tracing of the characteristic curve is necessary at 60. If both are the case (+ at both 58 and 60), the inverter 10 transmits a start signal 16 at 62 and begins to trace the characteristic curve 20 with provision of a first power profile at 64. After the termination of the tracing of the characteristic curve 20, the inverter 10 transmits an end signal at 66 and returns to the derated state at 68, wherein the derated power is, in one embodiment, related to the MPP power value $P_{MPP}$ which has been determined anew by the tracing of the characteristic curve. Optionally, the inverter 10 makes this updated MPP power value $P_{MPP}$ available to other connected inverters via a separate communication interface or via the bus 17. These inverters may adapt their value of the derated power $P_{red}$ with the aid of this updated MPP power value $P_{MPP}$, for example in order to take account of changes in the irradiation.

Figure 4:
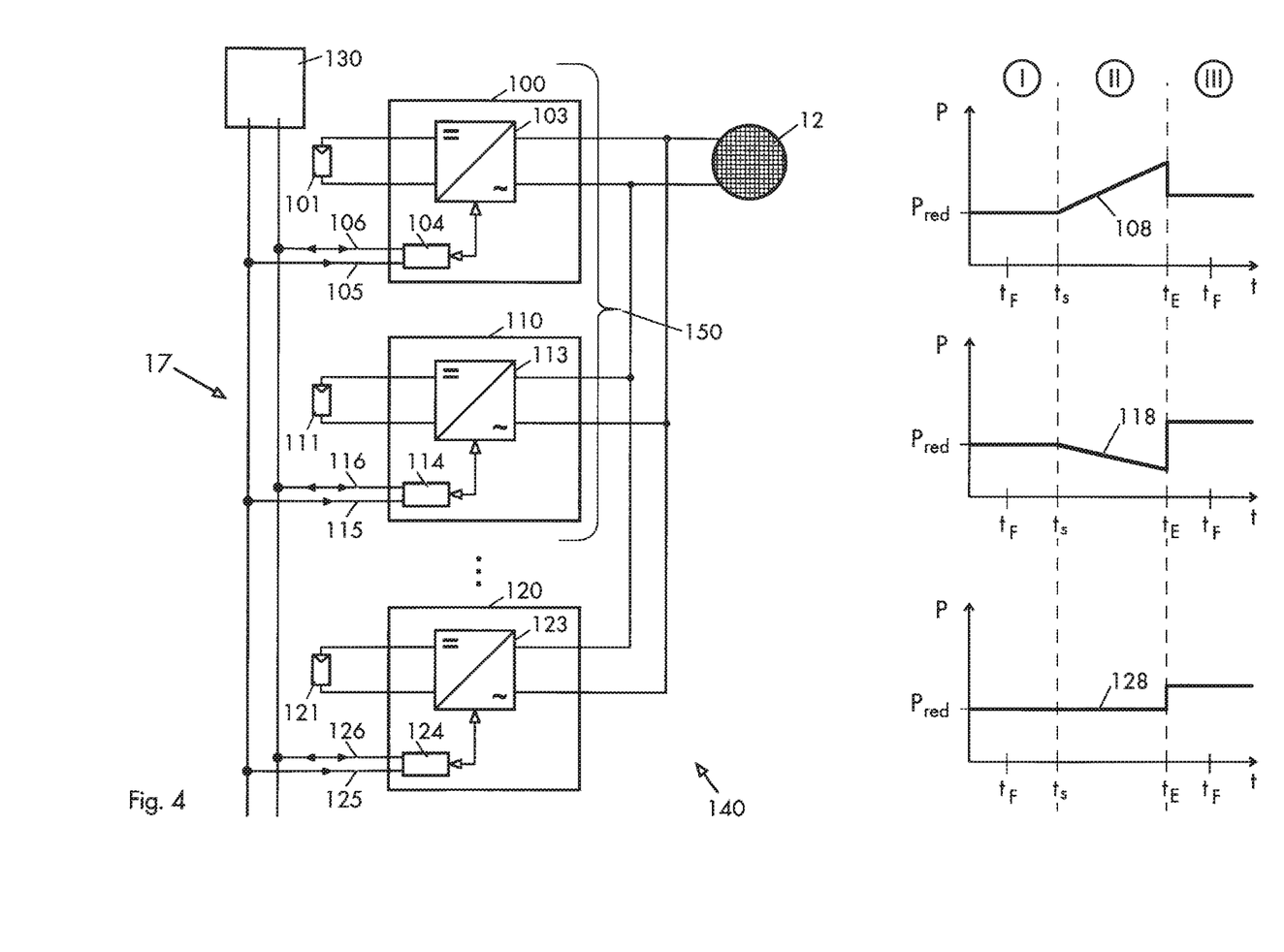
FIG. 4 shows a power generation network according to the disclosure with exemplary power profiles.

In a power generation network 140 according to the disclosure in accordance with FIG. 4, the interplay of a plurality of inverters using the method according to the disclosure is illustrated on the basis of an example. In the left-hand part of FIG. 4, a first inverter 100, a second inverter 110 and a third inverter 120 are connected to one another in each case via a bus 17. Via the bus, the enable signal 105, 115, 125 and the start signal 106, 116, 126 and assigned end signals may be transmitted and received among the inverters with the aid of scanning circuits 104, 114, 124. In addition, a control device 130 is connected to the bus 17, which control device may be used for example to generate corresponding enable signals 105, 115, 125 with the aid of the start signals 106, 116, 126 and the end signals, wherein enable signals may be valid specifically for the respective inverter as well as nonspecifically for all of the inverters. Accordingly, the control device 130 may generate an enable signal for an individual inverter, for a group of inverters or for all of the inverters. In this way, the control device 130 may concomitantly determine or define the order and frequency with which the inverters of the power generation network 140 trace their respective characteristic curves. Alternatively, however, it is also conceivable for the inverters to determine this order among one another. This may be performed for example by passing on a token among the inverters. However, the order may also arise without a coordination among the inverters by virtue of the fact that each inverter itself determines the point in time at which it traces its characteristic curve, provided that an enable signal is present. Therefore, the control device 130 may also be absent within the power generation network 140.

Each of the inverters 100, 110, 120 converts a DC power of a connected generator 101, 111, 121 with an inverter bridge 103, 113, 123 respectively assigned to the inverter into an AC power and feeds the latter into a connected grid 12. The power to be converted may be controlled via the respective scanning circuit 104, 114, 124 of the inverter depending on the received signals.

An exemplary power profile that results from an execution of the method according to the disclosure is illustrated in the right-hand part of FIG. 4 in the form of three diagrams which are respectively assigned to one of the three inverters 100, 110, 120 and in which time is plotted on the X-axis and power is plotted on the Y-axis. In this case, the top right diagram is assigned to the inverter 100, the middle right diagram is assigned to the inverter 110 and the bottom right diagram is assigned to the inverter 120. In a phase I, all the inverters are in the derated state and in each case provide a derated power $P_{red}$. At an enable point in time $t_F$, an enable signal is present at least at the first inverter 100. At a start point in time $t_S$, at which the phase II begins, the first inverter 100 transmits a start signal 106 and begins to trace its generator characteristic curve with provision of a first power profile 108. In the case shown, the first power profile 108 comprises a linear increasing converter power of the first inverter 100. The second phase II ends at an end point in time $t_E$, at which the inverter 100 transmits an end signal and returns to a derated state, wherein the inverter 100, in the subsequent phase III, provides a changed derated power that takes account of the present MPP power value $P_{MPP}$ determined during the tracing of the characteristic curve.

The middle right diagram shows the power profile 118 of the second inverter 110. At the start point in time $t_S$, the second inverter 110 receives the start signal of the first inverter 100 and provides a second power profile 118 at its output. In the example shown, the converter power decreases linearly with time. At the end point in time $t_E$, the second inverter 110 receives the end signal of the first inverter 100 and returns to a derated state, wherein the derated power $P_{red}$ is adapted depending on a present MPP power value provided by the first inverter 100. In the example shown, the second power profile 118 of the second inverter 110 compensates for the deviation of the first power profile 108 of the first inverter 100 from the respective derated power $P_{red}$, such that the sum of the power outputs of both inverters substantially or exactly corresponds to the sum of the derated powers $P_{red}$ before the start point in time $t_S$. This prevents the tracing of the characteristic curve for determining a present MPP power value $P_{MPP}$ from leading to a deviation of the cumulative power output of the power generation network 140 from the predefinitions of the derating.

Referring to FIG. 2, which describes a tracing of the characteristic curve with a power profile in which a central signal is transmitted upon the change between a rising power ramp and a falling power ramp, in an alternative embodiment (not shown) accordingly the second power profile of the compensating inverter 110 may have an initially falling power ramp and then a rising power ramp, wherein the change between the power ramps takes place upon reception of the central signal.

The bottom right diagram illustrates the power profile of the third inverter 120. At the start point in time $t_S$, the third inverter 120 does not leave its derated state, and so its power profile 128 maintains the temporally constant value of its derated power $P_{red}$. Therefore, in this example, the third inverter 120 does not participate in the compensation of a power deviation of one of the inverters of the power generation network 140 during the tracing of a characteristic curve. At the end point in time $t_E$, the third inverter 120 also adapts its derated power $P_{red}$ depending on the present MPP power value communicated by the first inverter 100.

In a further embodiment, the power deviation of one of the inverters of the power generation network 140 during the tracing of its characteristic curve may be jointly compensated for by a plurality, in particular by all, of the other inverters of the power generation network 140. The contribution to the compensation of the power deviation may be distributed equally or distributed in a suitably weighted manner among the inverters involved. In the context of one advantageous configuration, a fixed assignment among inverters may be implemented, which assignment defines which inverter or which partial group of inverters compensates for the deviating power of another inverter of the network. This may be implemented in a simple manner by an identification of the transmitting inverter being added to the transmitted start signal, such that the receiving inverter provides its second power profile only if the latter is assigned to the transmitting inverter for compensation.

In order to achieve as complete compensation of the power deviation as possible, it is advantageous for the first power profile, during the tracing of the characteristic curve, to be predetermined as well as possible and not to be determined or to be determined only slightly by the progression of the characteristic curve. Ideally, the progression of the first power profile does not depend on the progression of the characteristic curve, rather the progression of the characteristic curve merely determines the time duration between the start point in time $t_S$ and the end point in time $t_E$ of the tracing of the characteristic curve. In this way, it is not necessary to communicate an extent of a power deviation of the inverter tracing a characteristic curve among inverters of the power generation network in order to achieve a sufficient or even complete compensation of the power deviation. Since, in the cases in which instead of a predefined first power profile a voltage or current profile is predefined by the inverter 100, from which the first power profile arises depending on the generator characteristic curve, in general only a partial compensation of the power deviation is achievable, a complete compensatability is dispensed with here in favor of a tracing of the characteristic curve that can be realized more easily.

Figure 5:
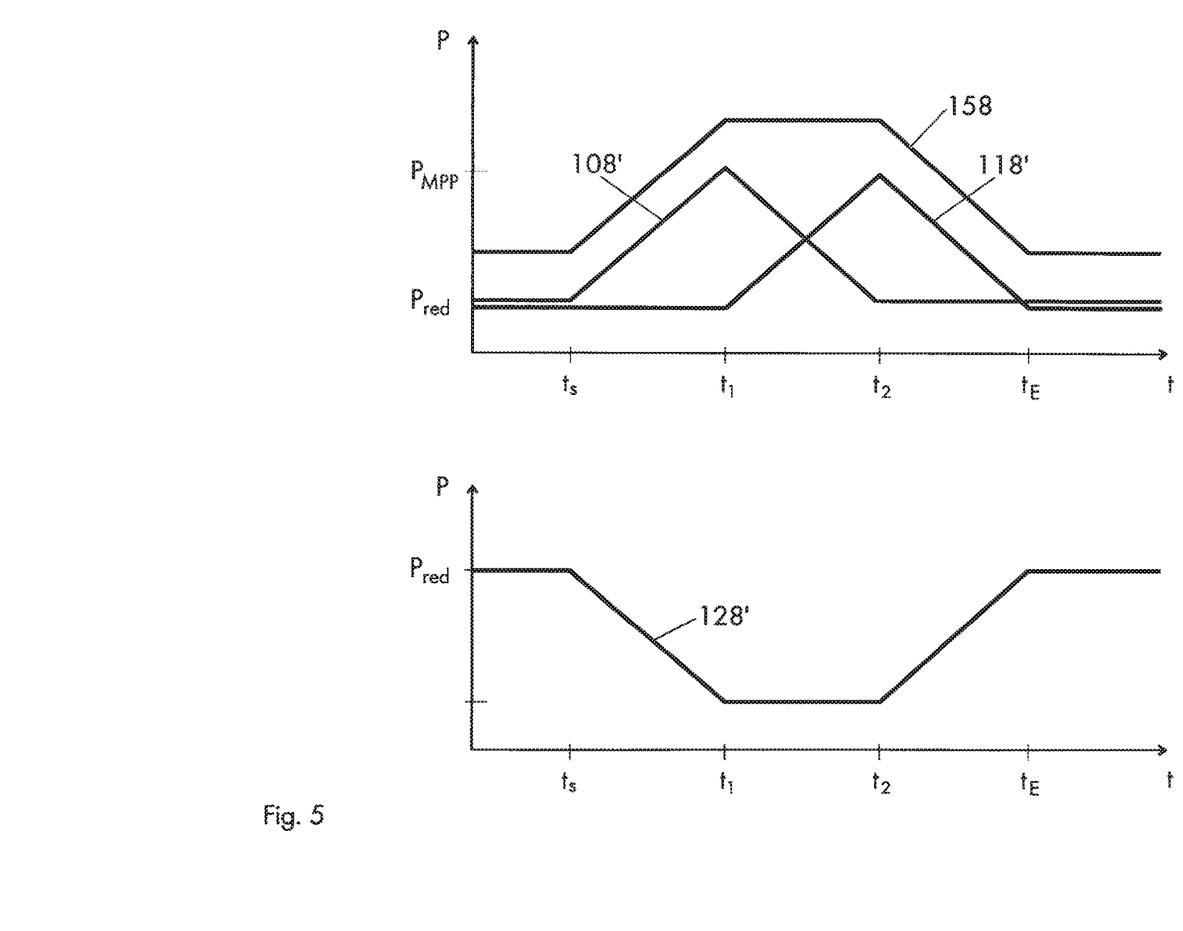
FIG. 5 shows power profiles of a further embodiment according to the disclosure.

In a further embodiment, the tracing of the generator characteristic curve within an inverter group comprising a plurality of individual inverters of the power generation network 140 is performed in a coordinated manner in such a way that the individual inverters carry out the tracing of the characteristic curve successively, but in a temporally overlapping manner. In this case, a constant time offset may be chosen, or signals are exchanged, for example the above-described central signal, for the coordination of the individual tracing processes. By way of example, the inverters 100 and 110 in FIG. 4 as individual inverters form such a group 150. FIG. 5 shows exemplary power profiles of the power generation network 140 when this embodiment is implemented, wherein the top diagram shows the first power profiles 108', 118' of the group 150 of inverters 100, 110 as individual inverters. The bottom diagram then shows the second power profile 128' of the inverter 120, which compensates for the combined power profile 158 of the group 150 as the sum of the first power profiles 108', 118'. At the start point in time $t_S$, the inverter 100 begins to trace its characteristic curve in the direction of its MPP by means of a rising power ramp and a start signal 106 is generated. Upon reaching the MPP at the point in time $t_1$, the inverter 100 reduces its power output by means of a decreasing power ramp until the derated power $P_{red}$ is reached again and the inverter 100 changes to the derated state. Simultaneously at the point in time $t_1$, the inverter 110 begins to increase its power via a ramp until it reaches its MPP at the point in time $t_2$ and changes to a decreasing power ramp. At the point in time $t_E$, the inverter 110 reaches the derated state again and an end signal is generated. Consequently, the group 150 behaves comparably to an individual inverter according to the disclosure by outputting a combined first power profile 158 between a start signal and an end signal. The deviation of the combined power profile 158 from the derated power $P_{red}$ of the group 150 is compensated for by the inverter 120 by outputting a second power profile 128' between the points in time of the start signal and the end signal, wherein the inverter 120 may react, if appropriate, to central signals at the points in time $t_1$, $t_2$ by adapting the profile progression.

The start signal and the end signal may be generated in principle by arbitrary individual inverters of the group 150, wherein the start signal and end signal are generated by the same inverter or by different inverters. In one embodiment, that individual inverter which traces its characteristic curve first transmits the start signal, and the end signal is transmitted by that individual inverter which traces its characteristic curve last. The intermediate points in time $t_1$, $t_2$ may be coordinated by exchanging central signals or the individual inverters involved determine these points in time by predefined time durations relative to the start signal. Moreover, the beginning of the tracing of the characteristic curve of an individual inverter may be chosen independently of the point in time of reaching an MPP by another individual inverter.

In a further advantageous embodiment of the method according to the disclosure, tracing the characteristic curve or providing a power profile is realized by virtue of the fact that the control circuit or unit 130 or one of the inverters of a power generation network successively transmits a plurality of setpoint values of the power output to a first inverter. The affected first inverter attempts to provide a power corresponding to the setpoint value and reports the result back to the transmitting unit. The result may be transmitted for example in the form of an attained power value or in the form of a logic signal which signals complete attainment of the setpoint value. Upon attainment of the setpoint value, the following transmitted setpoint value may be increased step by step until the inverter signals that it may not attain the setpoint value. The last setpoint value attained may then be interpreted as the MPP power value $P_{MPP}$. For the compensation of the total power of the power generation network, jointly with the transmission of a setpoint value exceeding the derated power to the first inverter a second setpoint value is transmitted to a second inverter (or a plurality of setpoint values are transmitted to a plurality of inverters), which is reduced in comparison with the derated power, such that the total power of the power generation network remains constant or almost constant.

After attaining the MPP power value $P_{MPP}$, the inverter may be returned to the derated power step by step by predefining new setpoint values, wherein the return to the derated power by means of a single step is not ruled out. The compensating power predefinition to the second inverter or the corresponding inverter group is performed in parallel in order to ensure a constant total power also during the return to the derated power. Afterward, a tracing of the characteristic curve of a further inverter may be started in the same way. Although the method configured in this way results in an increased communication overhead in comparison with some of the methods described above, it makes it possible very well to achieve a complete compensation of the deviation of the power generation network from the derated power.

In a modification of the method described above, reporting back the result regarding the attainment of the setpoint value may be dispensed with by monitoring the total power. If the setpoint value exceeds the maximum achievable power of the first inverter, this leads to a fall in the total power which corresponds to the extent of the exceedance. In this method modification the setpoint value is increased until the fall in the total power exceeds a threshold value. The MPP power value $P_{MPP}$ then corresponds to the last setpoint value without a fall in the total power.

Figure 6:
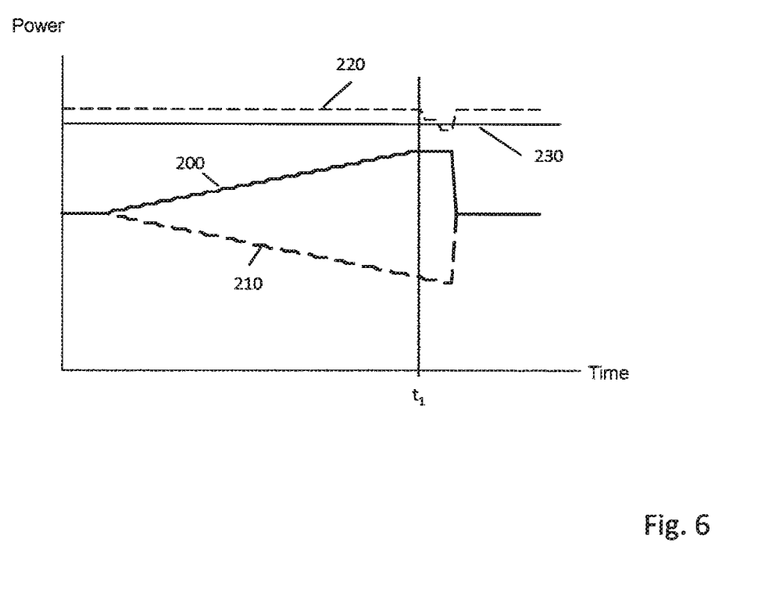
FIG. 6 shows power temporal power progressions of first and second inverters.

FIG. 6 illustrates the temporal power progressions 200, 210 of the first and second inverters, and also the power progression 220 of the total power as a result of the method described above. By means of changes of setpoint value the power 200 of the first inverter is increased step by step until the first inverter may no longer follow the setpoint value at the point in time $t_1$. Simultaneously, the power of the second inverter 210 is decreased step by step in compensating steps, such that the total power 220 remains constant. As a consequence, after the point in time $t_1$ a decrease of the total power 220 arises until the latter falls below a predefined limit value 230. The power of both inverters is then returned to the original derated power. If an altered MPP power value $P_{MPP}$ was determined, the power of both inverters may alternatively be returned to a correspondingly altered derated power.

It should be pointed out that the time-offset tracing of the characteristic curves within the group 150 already leads to a reduction of the maximum power deviation of the combined power profile of the group from the common derated power of the group in comparison with the case of the simultaneous tracing of the characteristics curves by all or a plurality of inverters of the group.

The invention claimed is:

1. An inverter for converting DC power of a generator into grid-conforming AC power, comprising:
    an inverter bridge circuit; and
    a scanning circuit configured to trace at least one part of a characteristic curve of the generator to determine an MPP power value ($P_{MPP}$),
    wherein the scanning circuit is configured, in the case of a derating to a derated power ($P_{red}$), to trigger a tracing of the characteristic curve with provision of a first power profile deviating from the derated power ($P_{red}$) if an enable signal is present at the inverter, and to indicate a start and an end of the tracing by outputting a start signal and an end signal, respectively, and wherein the scanning circuit is configured to provide a second power profile as AC power upon receiving a start signal, and wherein the first power profile has a deviation from the derated power ($P_{red}$) with a sign that is opposite to a sign of a deviation of the second power profile from the derated power ($P_{red}$).

2. The inverter as claimed in claim 1, wherein the inverter is configured to provide the MPP power value ($P_{MPP}$) after tracing the characteristic curve via a communication interface.

3. The inverter as claimed in claim 1, wherein the first power profile has increased power values in comparison with the derated power ($P_{red}$).

4. The inverter as claimed in claim 1, wherein the inverter is configured to connect to the Internet for the purpose of transmitting the enable signal, the start signal and the end signal.

5. The inverter as claimed in claim 1, wherein the derated power ($P_{red}$) comprises a predefined percentage of the MPP power value ($P_{MPP}$).

6. The inverter as claimed in claim 1, wherein the derated power comprises a value that is reduced by a predefined percentage of a rated power of the inverter or of the generator in comparison with the MPP power value ($P_{MPP}$).

7. A power generation network, comprising:
a first inverter and a second inverter, wherein the first inverter and the second inverter each comprise:
an inverter bridge circuit; and
a scanning circuit configured to trace at least one part of a characteristic curve of the generator to determine an MPP power value ($P_{MPP}$),
wherein the scanning circuit is configured, in the case of a derating to a derated power ($P_{red}$), to trigger a tracing of the characteristic curve with provision of a first power profile deviating from the derated power ($P_{red}$) if an enable signal is present at the inverter, and to indicate a start and an end of the tracing by outputting a start signal and an end signal, respectively, and
wherein the scanning circuit is configured to provide a second power profile as AC power upon receiving a start signal, and
wherein the first power profile has a deviation from the derated power ($P_{red}$) with a sign that is opposite to a sign of a deviation of the second power profile from the derated power ($P_{red}$), and
wherein the first inverter and the second inverter are connected to one another and are configured to exchange the enable signal, the start signal and the end signal with one another.

8. The power generation network as claimed in claim 7, further comprising a control device configured to generate the enable signal, wherein the control device is connected to the first inverter and the second inverter.

9. The power generation network as claimed in claim 7, wherein the power generation network is configured to alternately trigger the tracing of the characteristic curves within the power generation network via a token.

10. The power generation network as claimed in claim 7, wherein the first inverter is configured to adapt its derated power ($P_{red}$) depending on the MPP power value ($P_{MPP}$) of the second inverter.

11. The power generation network as claimed in claim 7, wherein the first inverter is connected to a generator with an adjustable orientation, and wherein the first inverter is configured to provide the first power profile by adjusting the generator orientation.

12. The power generation network as claimed in claim 7, wherein the first inverter comprises a group having a plurality of inverters configured to trace their characteristic curve successively in a temporally overlapping manner.

13. A method for converting DC power of a generator into grid-conforming AC power by an inverter comprising a scanning circuit that is configured to trace at least one part of a characteristic curve of the generator for determining an MPP power value ($P_{MPP}$) if the inverter is in a state reduced to a derated power ($P_{red}$), comprising:
tracing the characteristic curve with provision of a first power profile deviating from the derated power ($P_{red}$), under a precondition that an enable signal is present at the inverter,
transmitting a start signal at a beginning of the tracing and transmitting an end signal at an end of the tracing of the characteristic curve, and
providing a second power profile as AC power upon receiving the start signal, wherein the first power profile has a deviation from the derated power ($P_{red}$) with a sign that is opposite to a sign of a deviation of the second power profile from the derated power ($P_{red}$).

14. The method as claimed in claim 13, wherein the inverter comprises a group having a plurality of individual inverters, and wherein tracing the characteristic curve is performed by the individual inverters of the group tracing an individual characteristic curve assigned to the individual inverters successively in a temporally overlapping manner.

15. The method as claimed in claim 13, carried out on a first inverter and a second inverter, wherein tracing the first characteristic curve is performed by a step by step increase of a setpoint value of the power for the first inverter, and wherein tracing the second characteristic curve is performed by a step by step decrease—compensating for the increase—of a setpoint value of the power for the second inverter.

16. The method as claimed in claim 15, further comprising tracing the first characteristic curve by a step by step increase of a setpoint value of the power for the second inverter and tracing the second characteristic curve by a step by step decrease of a setpoint value of the power for the first inverter, the decrease compensating for the increase of the setpoint value of the second inverter.

* * * * *